W. G. HILL.
SANITARY URINAL.
APPLICATION FILED FEB. 17, 1919.
1,330,588.
Patented Feb. 10, 1920.
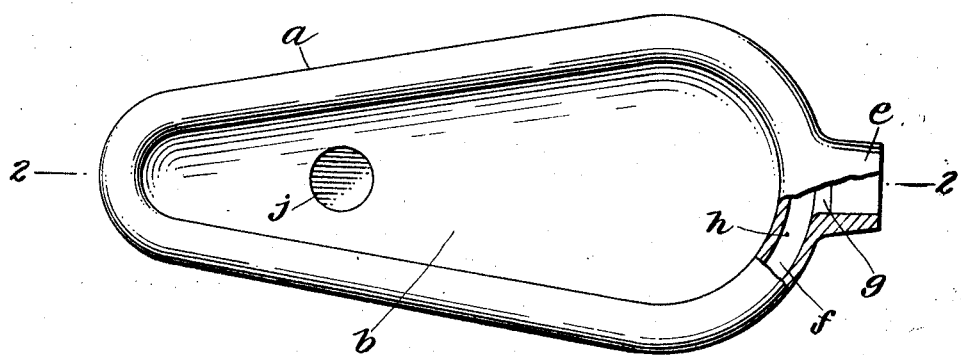
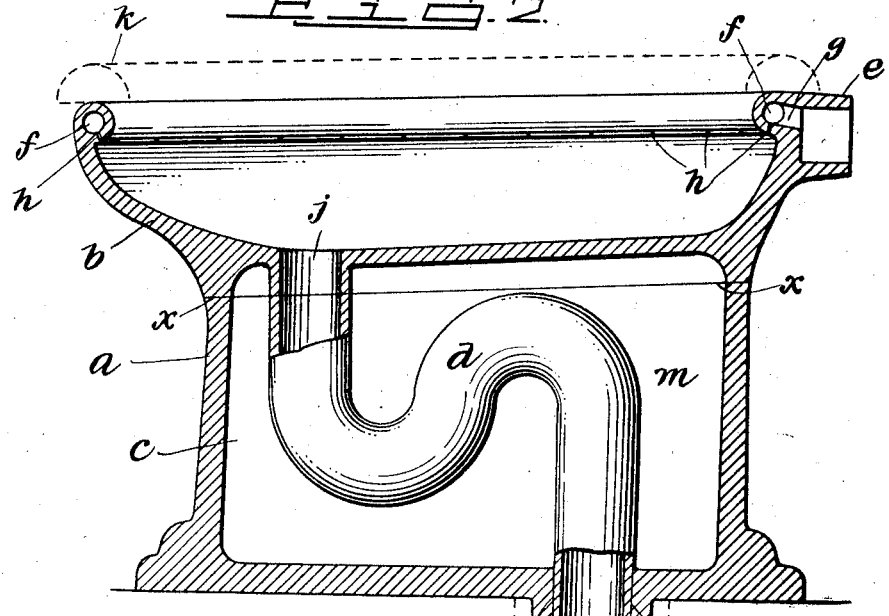
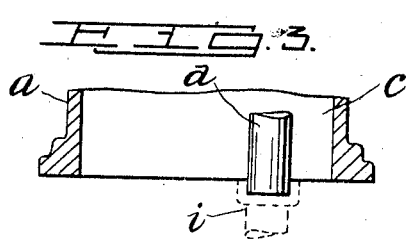
Inventor,
William G. Hill,
By his Attorneys
Edgar Tate Co.

UNITED STATES PATENT OFFICE.

WILLIAM G. HILL, OF BROOKLYN, NEW YORK.

SANITARY URINAL.

1,330,588.  Specification of Letters Patent.  Patented Feb. 10, 1920.

Application filed February 17, 1919. Serial No. 277,470.

*To all whom it may concern:*

Be it known that I, WILLIAM G. HILL, a citizen of the United States, and residing at Brooklyn, in the county of Kings and State of New York, have invented certain new and useful Improvements in Sanitary Urinals, of which the following is a specification, such as will enable those skilled in the art to which it appertains to make and use the same.

This invention relates to what are known as urinal devices for use in public places, such as railway stations, hotels, office buildings and other places of this class; and the object thereof is to provide an improved device of the class specified which may be used not only in the places named, but in all other places or buildings where such devices are required; a further object being to provide a device of the class specified which while being particularly designed for the use of females may also be used by males as well, and which in addition to being particularly designed for a urinal may also be used for other purposes the same as the basins of waterclosets as now constructed; and with these and other objects in view the invention consists in a device of the class specified, constructed as hereinafter described and claimed.

The invention is fully disclosed in the following specification, of which the accompanying drawing forms a part, in which the separate parts of my improvement are designated by suitable reference characters in each of the views, and in which:—

Figure 1 is a plan view of a device showing my invention, the construction being partially in section or broken away;

Fig. 2 a partial section on the line 2—2 of Fig. 1; and,

Fig. 3 a detail view similar to that of Fig. 2 but showing a modification.

The invention described and claimed herein is an improvement on a similar device shown and described in a prior application filed by me November 19, 1918, Serial No. 263,139; and in the practice of the invention described and claimed herein I provide a urinal device $a$ comprising a top bowl portion $b$, a base or pedestal portion $c$ and a trap $d$.

The entire device as shown in Figs. 1 and 2 is made of porcelain or other earthenware and in the construction of this device the bowl portion $b$, the base or pedestal $c$ and the trap $d$ are made separately, said parts being preferably formed separately and on the line $x$—$x$ and $x^2$—$x^2$. After the bowl portion $b$, the base or pedestal portion $c$ and the trap $d$ are formed separately as above set out and are united in the position shown and connected by a suitable porcelain or other cement in the usual manner, or in any other way, after which the entire device is put in a retort or furnace where it is subjected in the usual manner to a high degree of heat for a suitable length of time, which operation fuses and connects the parts and gives the entire device the appearance of being formed integrally, which as a matter of fact it really is.

The bowl member $b$ is provided at its rear end with a coupling neck $e$ with which a water supply pipe may be connected, and the top rim portion of said bowl is formed in the shape of a pipe provided with a bore $f$ which communicates with the coupling neck $e$ as shown at $g$, and the top rim portion, made in the form of a pipe, is provided on its under side with fine discharge apertures $h$ which are adapted to discharge water all around and into the bowl so as to cleanse the sides and bottom thereof and flush said bowl, the contents of which are discharged through the trap $d$.

This forms, as will be seen, a complete urinal device involving the bowl, the base or pedestal and the trap, the trap being entirely within the base or pedestal and being concealed, and in the use of this device a discharge pipe indicated at $i$ in Fig. 2 may be connected therewith in the usual or any preferred way.

One of the distinctive features of my improved urinal device is its shape or form and dimensions, the bowl $b$ and the base or pedestal $c$ being extended longitudinally or forwardly and backwardly, their longitudinal dimensions being much greater than their transverse dimensions, and this forms an elongated bowl, the length of which is preferably about twenty-four inches, the height at the front end being preferably about fifteen inches and the height at the rear end being preferably about sixteen inches. The transverse dimensions of the front end of the bowl are preferably about five and a half inches, while the corresponding dimensions at the rear end of the bowl are preferably about eleven inches, and the bottom of the bowl is inclined forwardly from the rear end thereof to the trap discharge opening $j$ and the front bottom wall of the bowl is similarly inclined.

The inclination of the bottom portions of the bowl in the construction shown will be sufficient when the device is intended for use only as a urinal but when the said device is intended for use for other purposes as in the case of the basin in waterclosets generally, then and in that event the inclination of the bottom of the bowl to the trap or trap discharge should be greater to produce proper operation.

As hereinbefore stated, the height of the bowl both front and back, the length thereof, and the transverse dimensions thereof, form an important element in this invention, one of the objects of which is to permit a party using the device to straddle the same and sit thereon, and in the case of females this operation may be performed either by the party raising her skirts and moving forwardly over the device, or by moving backwardly of the device, and in either event the device will serve as a seat and the skirts will be kept clean and the entire device is thus made to serve most conveniently for the purposes for which it is intended, while at the same time being strictly sanitary, and when the device is used as a seat, as above set out, a supplemental seat member of wood or any other suitable material may be placed on the top of the bowl as indicated at $k$ in Fig. 2.

In the construction shown in Figs. 1 and 2, the bottom of the base or pedestal is closed and a closed oblong space or chamber $m$ is formed therein, the shape and dimensions of which are such as to accommodate the trap $d$, but in Fig. 3 of the drawing is shown a modification in which the bottom of the base or pedestal $c$ is left open, and in this event, or with this construction, the trap $d$ may be formed and used as hereinbefore described, or it may be formed separately and applied in the usual or any preferred manner.

It will be understood that while I have shown and described one method of putting my invention into practical form in connection with which I have shown certain details of construction involving the dimensions thereof, which dimensions are at least aproximately those preferred for the reasons herein set out, my invention is not limited to the exact details shown and described, and changes therein and modifications thereof, may be made, within the scope of the appended claims without departing from the spirit of the invention or sacrificing its advantages.

It will also be understood that while I have previously stated that the user of the device straddles and sits upon the same, my invention is not limited to this use as the device may be used by simply straddling the same, in which event the seat member $k$ indicated in dotted lines in Fig. 2 will not be employed.

Having fully described my invention, what I claim as new and desire to secure by Letters Patent, is:—

1. A urinal device of the class described, comprising an elongated trough-shaped bowl which ranges forwardly and backwardly and is tapered from the rear end thereof forwardly and is provided with a hollow base which also ranges forwardly and backwardly, said base being provided with a trap which is entirely inclosed in said base, the bottom of the bowl being provided at one end with a discharge aperture with which the trap is connected, the transverse dimensions and the height of the bowl and base being such as to permit the straddling of the device by the user and to permit the bowl to serve as a seat.

2. A urinal device of the class described comprising a forwardly and backwardly elongated bowl, a base which is also elongated forwardly and backwardly and the transverse dimensions of which are less than those of the bowl, and a trap entirely inclosed in the base, the bottom of the base being closed and provided with a discharge aperture, the bottom of the bowl at one end being provided with a discharge aperture and the trap being connected with and communicating with said apertures.

3. A urinal device of the class described comprising a bowl elongated forwardly and backwardly, a hollow base closed at the bottom and a trap entirely inclosed in the base, the bottom of the bowl being provided at one end with a discharge aperture and the bottom of the base at the opposite end with a discharge aperture, and the trap being connected with and communicating with said apertures, said bowl, base and trap being formed separately and connected, and the height of the bowl and the transverse dimensions thereof and of the base being such as to permit of the straddling of the device by the user.

4. A urinal device of the class described comprising an elongated trough-shaped bowl which ranges forwardly and backwardly and the transverse dimensions of which are tapered forwardly and the bottom of which is provided at one end with an aperture, a base on which the bowl is supported, and a trap entirely inclosed in the base, the bottom of said base being provided at one end with a discharge aperture and the trap being connected therewith and with the discharge aperture in the bottom of the bowl, and the height of the bowl at both ends and the transverse dimensions thereof being such as to permit of the straddling of the device by the user and to permit the bowl to serve as a seat.

In testimony that I claim the foregoing as my invention I have signed my name in presence of the subscribing witnesses this 15th day of February, 1919.

WILLIAM G. HILL.

Witnesses:
C. E. MULREANY,
H. E. THOMPSON.